US009857254B2

(12) United States Patent
Meuter

(10) Patent No.: US 9,857,254 B2
(45) Date of Patent: Jan. 2, 2018

(54) TORQUE-MEASURING DEVICE OR JIG

(75) Inventor: Herbert Meuter, Herzogenrath (DE)

(73) Assignee: ATESTEO GMBH, Alsdorf (DE)

( * ) Notice: Subject to any disclaimer, the term of this patent is extended or adjusted under 35 U.S.C. 154(b) by 0 days.

(21) Appl. No.: 13/587,194

(22) Filed: Aug. 16, 2012

(65) Prior Publication Data
US 2013/0305842 A1 Nov. 21, 2013

Related U.S. Application Data

(60) Provisional application No. 61/688,646, filed on May 18, 2012.

(51) Int. Cl.
*G01L 3/10* (2006.01)
(52) U.S. Cl.
CPC .................................. *G01L 3/108* (2013.01)
(58) Field of Classification Search
CPC ............................................................ G01L 3/02
USPC ............................................. 73/862.192, 1.09
See application file for complete search history.

(56) References Cited

U.S. PATENT DOCUMENTS

| 3,791,203 A * | 2/1974 | Rice .......................... G01H 1/10 73/650 |
| 4,240,296 A * | 12/1980 | Kolodziej ....................... 73/650 |
| 4,758,967 A * | 7/1988 | Shmuter et al. ............ 73/115.01 |
| 5,962,788 A * | 10/1999 | Fawcett .............. G01P 15/0802 73/514.17 |
| 8,506,555 B2 * | 8/2013 | Ruiz Morales .................... 606/1 |
| 2010/0162830 A1 | 7/2010 | Meuter et al. |
| 2010/0307218 A1 | 12/2010 | Meuter et al. |

FOREIGN PATENT DOCUMENTS

| EP | 0547742 A1 * | 6/1993 | ............ G01P 15/125 |
| WO | WO 2007/143986 | 12/2007 | |
| WO | WO 2009/062481 | 5/2009 | |
| WO | WO 2011/107070 | 9/2011 | |

OTHER PUBLICATIONS

Authors: Hal A. Aldridge and Jer-Nan Juang, Title: Experimental Robot Position Sensor Fault Tolerance Using Accelerometers and Joint Torque Sensors, Date: Mar. 1997, Publisher: National Aeronautics and Space Administration, NASA Technical Memorandum 110335, pp. 1-14.*
Author: unknown, Title: Model TMF 401-403 Torque Flange Transducer User's Manual, Date: Aug. 2003, Publisher: Magtrol, Inc., pp. cover, bibliography, i-iv and 1-24.*

* cited by examiner

*Primary Examiner* — Harshad R Patel
(74) *Attorney, Agent, or Firm* — Collard & Roe, P.C.

(57) ABSTRACT

A torque-measuring device with an acceleration transducer yields more informative measured results. The acceleration transmitter may be inseparably fastened to a carrier which in turn is inseparably joined to a torsion member. The torsion member and the carrier may be formed in one piece with one another. The torsion member may be a shaft and the carrier may be a flange.

9 Claims, 4 Drawing Sheets

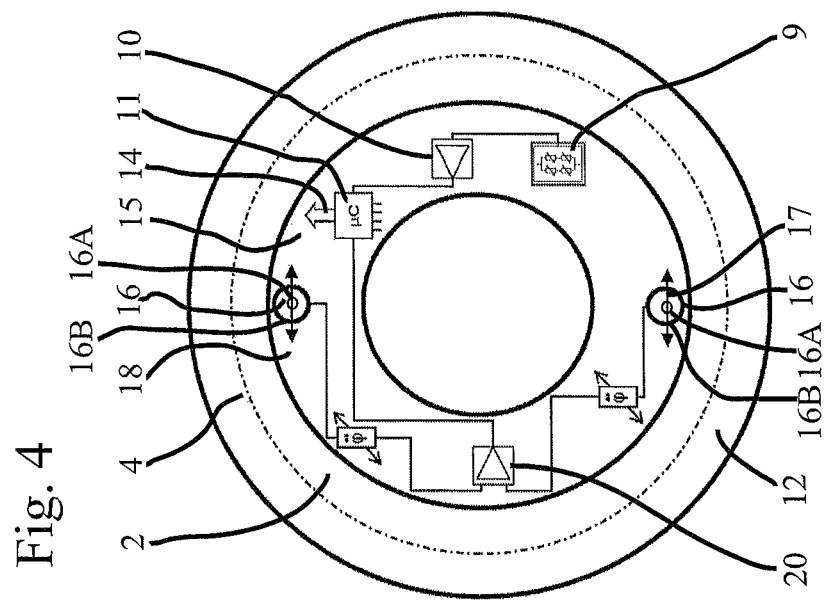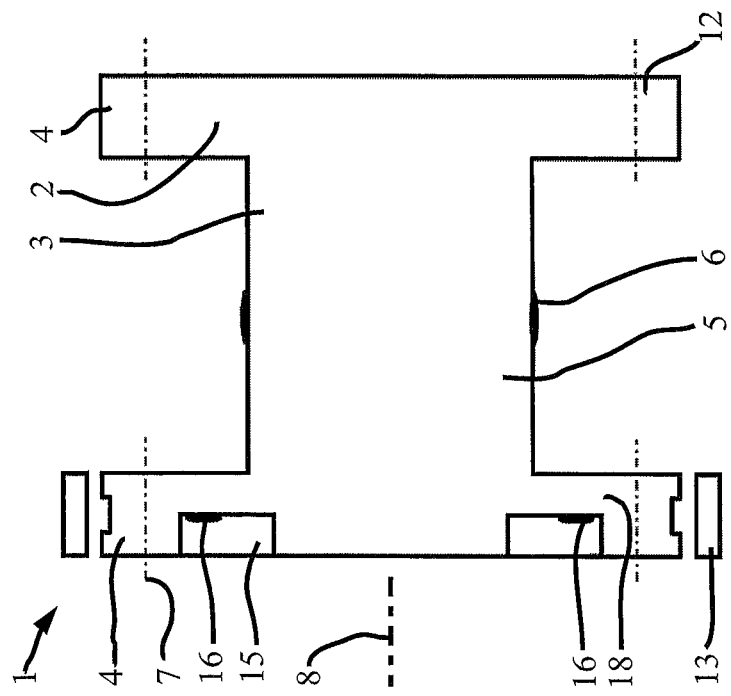

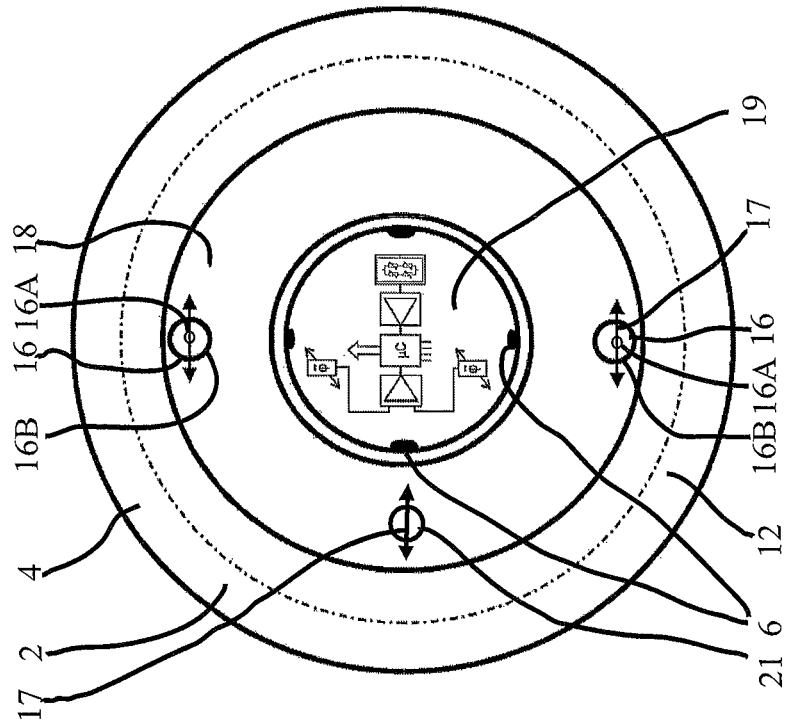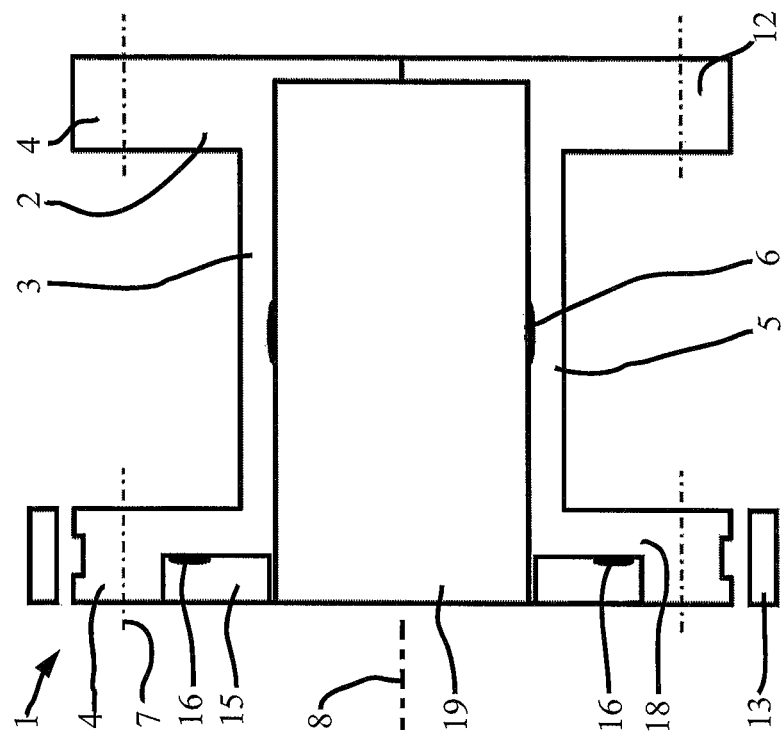

TORQUE-MEASURING DEVICE OR JIG

CROSS REFERENCE TO RELATED APPLICATIONS

This application is a non-provisional application that hereby claims priority under 35 U.S.C. 119(e) from U.S. Provisional Patent Application Ser. No. 61/688,646 filed May 18, 2012, the disclosure of which is incorporated herein by reference.

BACKGROUND OF THE INVENTION

1. Field of the Invention

The invention relates to a torque-measuring device or jig.

2. Description of the Related Art

Such torque-measuring devices are known, for example, from WO 2007/143986 A1, from WO 2009/062481 A1 or from WO 2011/107070 A1. In this case, all of the torque-measuring devices illustrated therein are intended to be mounted on rotating shafts, in order to be able to measure the torques occurring during the rotation and the torque transmission. The associated torque-measuring jig comprises, besides the torque-measuring device, also stationary subassemblies, especially for receiving the measured data and for similar purposes.

SUMMARY OF THE INVENTION

It is the task of the present invention to provide a torque-measuring device which—if so desired—yields more informative measured results.

As the solution, a torque-measuring device with at least one acceleration transducer is proposed.

The measured signals of a torque-measuring device characterized by at least one acceleration transducer not only permit an acquisition of torques and also accelerations but also make it possible, because the acceleration transducer is included in the torque-measuring device, to set the corresponding measured results in correlation, because any phase shifts that may be present between the measured signals can be reduced to a minimum by virtue of the short distance.

Preferably the torque-measuring device comprises a torsion member and the acceleration transducer is inseparably fastened to a carrier, wherein the torsion member is inseparably joined to the carrier. In this way, any measurement artifacts that may occur, for example due to uncontrolled phase shifts between the measured torques and the measured accelerations, can be reduced to a minimum.

The correlation of the measured signals is particularly strong when the torsion member and the carrier are formed in one piece with one another.

Preferably a shaft, which yields good measured results in particular at high speeds of revolution, is used as the torsion member. On the other hand, other forms, such as appropriately shaped plates, may also be used as the torsion member.

As the carrier it is possible to use a flange, which usually has sufficient space so that the acceleration transducer may be mounted directly there. Given appropriate geometry of the flange, the acceleration transducer may be mounted relatively far out in radial direction, so that it reacts relatively sensitively.

In one specific implementation, an active axis of the at least one acceleration transducer may be aligned in a circumferential direction around an axis of rotation of the torque-measuring device. Torques are measured by the torque-measuring device around this axis of rotation. In this way the acceleration transducer also senses accelerations in the circumferential direction, so that the accelerations that act around the axis of rotation in direct correlation with the torque are likewise effectively sensed.

Acceleration transducers that are fastened to rotating bodies frequently exhibit a measured signal dependent on the speed of revolution; consequently a same acceleration is indicated at different speeds of revolution or yields a different measured value. This result may be due, for example, to a seismic mass and its suspension, when a corresponding acceleration transducer is employed. Corresponding measurement artifacts occur detrimentally to a particular extent when the active direction points in circumferential direction around the axis of rotation of the rotating body. The magnitude of such a measurement artifact may be ascertained or such a measurement artifact may be compensated when an acceleration transducer of identical design with installation direction disposed oppositely in radial direction is included in the torque-measuring device. Alternatively or cumulatively, a further acceleration transducer with a radially aligned active axis may be provided, which is able to measure the centrifugal forces directly and to be used for compensation of speed of revolution.

Measurement artifacts can further be reduced to a minimum when, cumulatively or alternatively to these features, the acceleration transducer is fastened to a subassembly of the torque-measuring device loaded with a torque. This arrangement leads to direct reactions of the corresponding acceleration transducer when accelerations occur. A torque-free subassembly, such as a dead end or similar, for example, may lead to falsifications of the measured result here because of its inertial mass.

Accordingly, it is of advantage when the actual measuring element, such as seismic mass, for example, is fastened with its encapsulating housing of the acceleration transducer to the subassembly loaded with torque. This fastening may be accomplished, for example, by adhesive bonding. All other possible measures may also be used, such as screw coupling, clamping or similar measures, in which case a joint as inherently rigid or as low-inertia as possible is to be ensured if at all possible.

Rotating torque-measuring devices, which accordingly are disposed only on one rotor, usually cooperate with a stator and in this way form a torque-measuring jig. Advantageously a contactless data transmission takes place between the rotor and the stator. In this way, measurement artifacts, which could falsify the torque measurement or also the acceleration measurement by friction or similar forces, for example, are reduced to a minimum by virtue of the data transmission.

If necessary the rotor is equipped with its own energy source, so that hereby also the danger of measurement artifacts is minimized. If necessary, a contactless energy transmission, such as via electromagnetic waves or inductive processes, for example, may also be used for an energy supply of the rotor.

In this case the contactless data transmission is able to transmit data dependent both on the torque and also on the acceleration. The contactless data transmission may be configured serially or with two separate channels, of which one transmits data dependent on the torque and the other data dependent on the acceleration. In the case of two separate channels, the transmitters on the torque-measuring device side are preferably also disposed on the same subassembly of the torque-measuring device. In this way, an extremely compact construction results.

It is understood that the features of the solutions described in the foregoing or in the claims may also be combined if necessary, in order to be able to implement the advantages in correspondingly cumulative manner.

BRIEF DESCRIPTION OF THE DRAWINGS

Further advantages, objectives and properties of the present invention will be explained on the basis of the following description of exemplary embodiments, which in particular are also illustrated in attached drawings.

In the drawings,

FIG. 3 shows a schematic section through a further torque-measuring jig in a diagram similar to FIG. 1;

FIG. 4 shows an elevation view of the torque-measuring device of the torque-measuring jig according to FIG. 3;

FIG. 5 shows a schematic section through a further torque-measuring jig in a diagram similar to FIGS. 1 and 3;

FIG. 6 shows an elevation view of the torque-measuring device of the torque-measuring jig according to FIG. 5.

DETAILED DESCRIPTION OF PREFERRED EMBODIMENT

Figure 2:
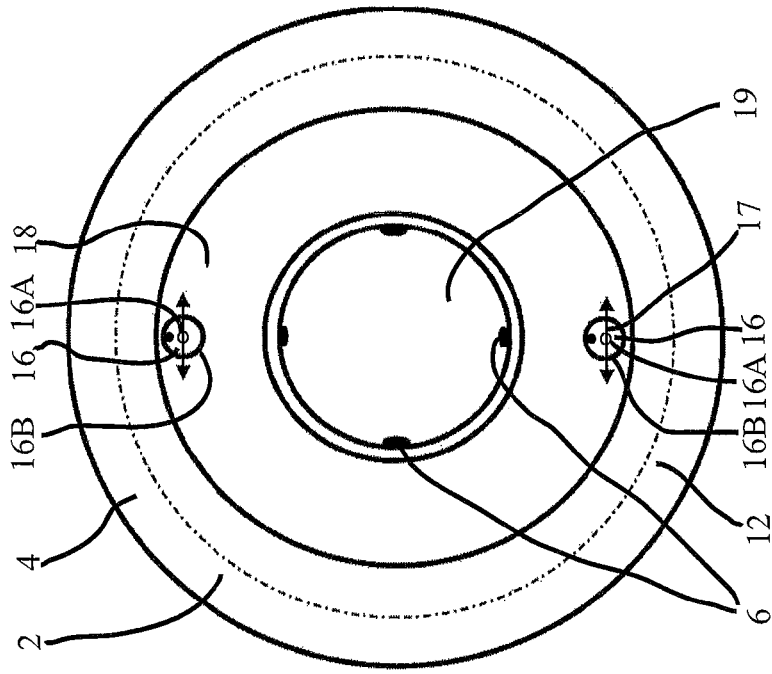
FIG. 2 shows an elevation view of the torque-measuring device of the torque-measuring jig according to FIG. 1.

The torque-measuring jigs 1 illustrated in FIGS. 1 to 6 respectively show a torque-measuring device 2, which for its part consists substantially of a measuring shaft 3, which is disposed between two flanges 4. Measuring shaft 3 is used in this case as the torsion member 5, via which torques may be sensed.

In the present exemplary embodiments, the torque is measured via strain gauges 6 (numbered merely by way of example), which are mounted on torsion member 5 or on measuring shaft 3 in a manner known in itself.

Via bores 7, torque-measuring device 2 may be introduced into a drive train or similar mechanism to be measured and be used for the measurement of torques. It is understood that a torque may also be measured in other ways using torsion member 5.

As is immediately apparent from the drawings, torque-measuring device 2 is able to rotate around an axis of rotation 8.

The strain gauges 6 in these exemplary embodiments are interconnected as a bridge circuit 9, the output signal of which is supplied to an amplifier 10 and measured by a microprocessor 11 and transmitted further from there.

Figure 1:
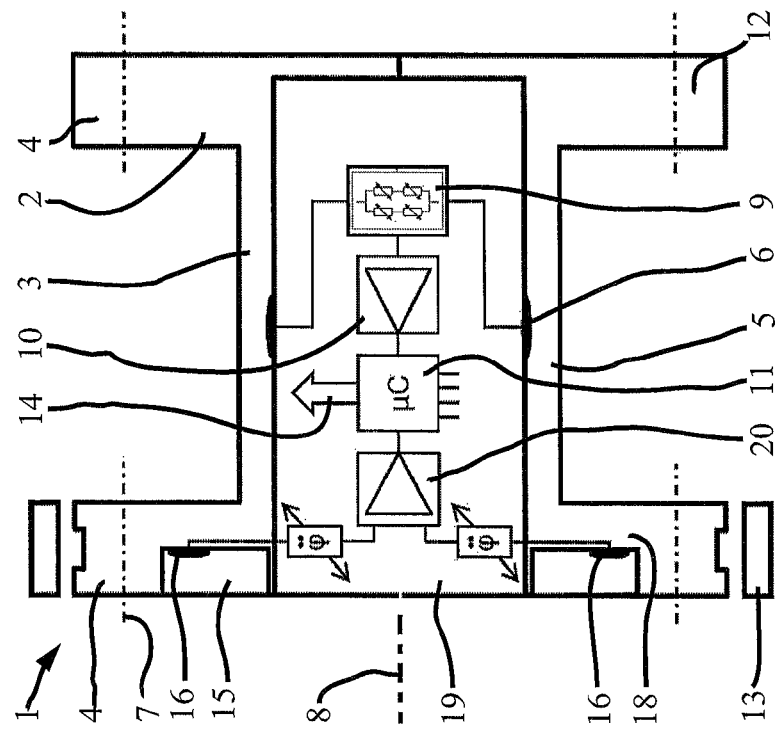
FIG. 1 shows a schematic section through a torque-measuring jig.

In the present exemplary embodiment, the transmission takes place via the flange illustrated at the left in FIGS. 1, 3 and 5, on which optical diodes, not illustrated in more detail, are disposed, which output a signal proportional to the measured torque.

For the receiving of this signal output by torque-measuring device 2, also constructed as rotor 12, one or more receiving devices, such as photosensitive resistors, for example, are disposed on a stator 13. In this way a contactless data transmission 14 (schematically illustrated by the large arrow) can be accomplished. On flange 4, which is surrounded by stator 13, a groove, not numbered is provided, in which an induction loop is disposed, via which energy may be transmitted in a way known in itself to torque-measuring device 2, so that torque-measuring device 2 may be supplied contactlessly hereby with current or energy.

In these exemplary embodiments, acceleration transducers 16, the active axes 17 of which (numbered merely by way of example and respectively illustrated by a double arrow) are aligned perpendicular to a radius aligned by axis of rotation 8 and in a circumferential direction around axis of rotation 8, in other words perpendicular to the drawing plane in FIG. 1, are disposed in a groove 15 of flange 4 used in the manner described in the foregoing for contactless data transmission 14. A seismic mass 16A is situated in an encapsulating housing 16B of acceleration transducer 16. The seismic mass 16A with its encapsulating housing 16B are fastened to the subassembly loaded with torque.

As is immediately apparent, the flange with groove 15 therefore serves as the carrier 18 for acceleration transducer 16. Because flange 4 is formed in one piece with torsion member 5 or measuring shaft 3, carrier 18 is therefore also formed in one piece with torsion member 5 and is joined inseparably to it.

As suggestively indicated by way of example by a small black dot in FIG. 2, acceleration transducers 16, which are intended for the application in these exemplary embodiments, have a preferential installation direction, wherein the measured results of the measured accelerations lie higher or lower in proportion to the speed of revolution in the dependence on the installation situation. Because this preferential direction points radially outward for one of the acceleration transducers 16 and radially inward for the other of the two acceleration transducers 16, a dependence on speed of revolution can be compensated in the exemplary embodiment illustrated in FIGS. 1 and 2. In the exemplary embodiment illustrated in FIGS. 3 and 4, the compensation takes place by a compensation table stored in memory in microprocessor 11 and by a measurement of speed of revolution, not illustrated in more detail.

In this case the entire measuring electronic unit in the exemplary embodiment illustrated in FIGS. 1 and 2 is disposed in a cavity 19 of measuring shaft 3, wherein the cavity is closed by a cover plate after the assembly, so that the measuring electronic unit is protected.

The results of acceleration transducer 16 are also supplied to an amplifier 20, the output signal of which is acquired by microprocessor 11 and likewise output via contactless data transmission 14.

As is immediately understandable, this task may be accomplished via the same channels. Likewise it is immediately conceivable to use a further channel for this task, in which, for example, light-emitting diodes are provided on a different frequency or at a different spatial location, such as on the other flange 4, for example. This alternative is indicated suggestively by way of example in the exemplary embodiment according to FIG. 7.

Whereas the arrangement of acceleration transducers 16 in the exemplary embodiment illustrated in FIGS. 3 and 4 corresponds to that of the exemplary embodiment according to FIGS. 1 and 2, measuring shaft 3 or torsion member 5 in the exemplary embodiments illustrated in FIGS. 3 and 4 is of solid construction. Accordingly, the electronic unit is disposed in the entirety in groove 15. In addition, the strain gauges are mounted in a radially outer position on measuring shaft 3.

The arrangement according to FIGS. 5 and 6 also corresponds substantially to the aforesaid arrangements, especially also with respect to the electronic unit, so that further detailed explanations are dispensed with and an explicit numbering in FIGS. 5 and 6 is dispensed with. In contrast to the exemplary embodiment according to FIGS. 1 and 2, however, the measuring electronic unit is mounted on the back side of flange 4 in cavity 19. Only the actual measured-value transducers, in other words strain gauges 6 or acceleration transducers 16, are connected at a different location and with suitable cables to the measuring electronic unit. The same is true for the incoming lines to the contactless data transmission.

It is understood that acceleration transducers 16 may also be fastened to their carrier 18 in some other way instead of in a circumferential groove 15. For example, merely singular recesses, such as bores, may be provided for this fastening. Likewise it is conceivable to place them only at suitable locations of the carrier. By countersinking acceleration transducers 16 in suitable recesses, they can be protected very well from damaging effects. In particular, it is also conceivable to plug the recesses, in order to ensure protection beyond what they provide.

Furthermore, in the exemplary embodiment according to FIGS. 5 and 6, a somewhat different compensation of speed of revolution is provided, so that the radial installation direction of acceleration transducers 16 is of subordinate importance. In this exemplary embodiment, compensation of speed of revolution may be accomplished by a calibration as well as by a further acceleration transducer 21. In this case, however, the active axis 17 of the further acceleration transducer 21 is aligned radially, in other words parallel to the radius extending from axis of rotation 8. Hereby accelerations or centrifugal forces depending on speed of revolution may be ascertained directly and used for compensation of speed of revolution.

Figure 7:
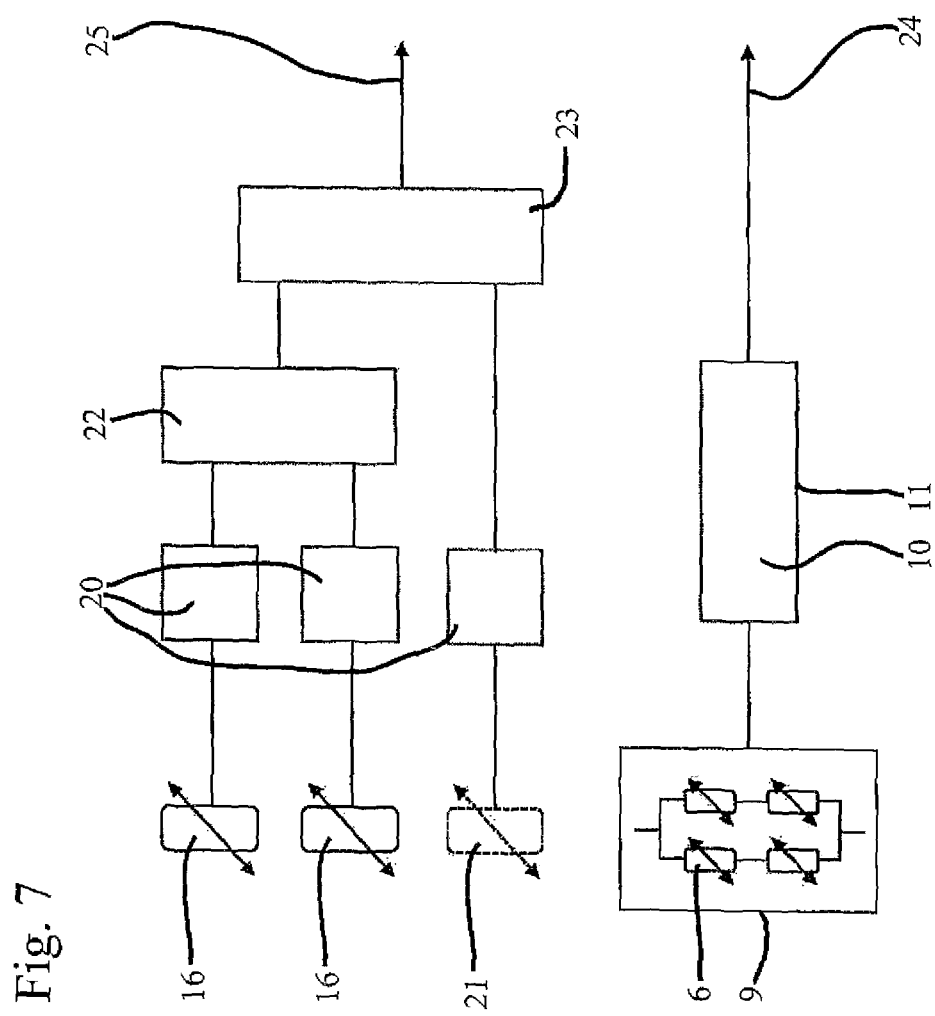
FIG. 7 shows a schematic diagram of a further electronic unit.

A circuit arrangement suitable for this embodiment is illustrated by way of example in FIG. 7.

Thus the signals of the two acceleration transducers 16 may be supplied on the one hand to a common amplifier 20, as suggestively indicated in FIG. 6, or else to two separate amplifiers 20, as illustrated in FIG. 7. In the case of supply to one amplifier 20, an appropriate addition of the measured signals takes place directly, whereas in the case of use of two amplifiers 20 this addition takes place preferably, and as illustrated in the exemplary embodiment according to FIG. 7, via a downstream adder 22.

The further acceleration transducer 21 may likewise be connected via an amplifier 20, in which case the output signal of adder 22 is then combined, in a further adder 23, with the output signal of amplifier 20, which amplifies the signals of the further acceleration transducer 21, as a total output signal, a suitable calibration of this addition being taken as basis if necessary in this further adder 23.

In the exemplary embodiment illustrated in FIG. 7, the output signal of the further adder 23 is supplied directly to a second channel 25 of the contactless data transmission, whereas the measured results of the strain gauges 6 combined as the bridge circuit 9 are supplied to an electronic unit comprising amplifier 10 and microprocessor 11 and then subsequently to a first channel 24 of the contactless data transmission. Via one or more light-emitting diodes, these two channels 24, 25 are separately able to undertake a contactless data transmission to a stator. It is understood, however, that a common contactless data transmission 14 may also be provided for this result. In this respect it remains a specific implementation of these embodiments as to how many channels the contactless data transmission should have or in which way the signals are directly preprocessed on torque-measuring device 2, because measured results of acceleration transducers 16, 21 may also be used if necessary for the correction of the measured results of strain gauges 6 or of other measuring devices used for the torque measurement.

Although only a few embodiments of the present invention have been shown and described, it is to be understood that many changes and modifications may be made thereunto without departing from the spirit and scope of the invention as defined in the appended claims.

What is claimed is:

1. A torque-measuring device, comprising a carrier and
at least one first acceleration transducer and a second acceleration transducer each being carried by the carrier;
wherein the torque-measuring device has an axis of rotation and measures torques around the axis of rotation;
wherein said at least one first acceleration transducer and said second acceleration transducer are separate acceleration transducers;
wherein one active axis of said at least one first acceleration transducer is aligned in a circumferential direction around the axis of rotation;
wherein one active axis of said second acceleration transducer is aligned in a radial direction with respect to the axis of rotation; and
wherein said at least one first and said second acceleration transducers each have only one single active axis.

2. The torque-measuring device according to claim 1, wherein the at least one first acceleration transducer is inseparably fastened to the carrier and the torque-measuring device comprises a torsion member inseparably joined to the carrier.

3. The torque-measuring device according to claim 2, wherein the torsion member and the carrier are formed in one piece with one another.

4. The torque-measuring device according to claim 2, wherein the torsion member is a shaft and the carrier a flange.

5. The torque-measuring device according to claim 1, wherein the at least one first acceleration transducer outputs a measured signal dependent on speed of revolution and wherein the at least one first acceleration transducer further comprises a second acceleration transducer; wherein said second acceleration transducer of the at least one first acceleration transducer has an identical design to the at least one first acceleration transducer and an installation direction disposed oppositely to the at least one first acceleration transducer in a radial direction or wherein said second acceleration transducer of the at least one first acceleration transducer has a radially aligned active axis with the at least one first acceleration transducer for compensation of speed of revolution.

6. The torque-measuring device according to claim 1, wherein the at least one first acceleration transducer is fastened to a subassembly of the torque- measuring device loaded with a torque.

7. The torque-measuring device according to claim 6, wherein the at least one first acceleration transducer comprises an encapsulating housing fastened to the subassembly loaded with torque.

8. The torque-measuring device according to claim 7, wherein the encapsulating housing comprises a seismic mass.

9. A torque-measuring device, comprising a carrier and
at least one first acceleration transducer and a second acceleration transducer each being carried by the carrier;

wherein the torque-measuring device has an axis of rotation and measures torque around the axis of rotation;
wherein one active axis of said at least one first acceleration transducer is aligned in a circumferential direction around the axis of rotation;
said one active axis of the at least one first acceleration transducer is aligned perpendicular to a radius aligned by said axis of rotation;
wherein the at least one first acceleration transducer and the second acceleration transducer both are separately fastened to a subassembly of the torque-measuring device loaded with a torque;
wherein the at least one first acceleration transducer and the second acceleration transducer both are comprising an encapsulated housing fastened to the subassembly loaded with torque; and
wherein each of the encapsulated housings comprises a seismic mass;
wherein one active axis of said second acceleration transducer is aligned in a radial direction with respect to the axis of rotation;
said one active axis of the second acceleration transducer is aligned perpendicular to a circumferential direction around the axis of rotation; and
wherein said at least one first and said second acceleration transducers each have only one single active axis.

* * * * *